United States Patent
Chuan

(10) Patent No.: US 7,921,516 B2
(45) Date of Patent: Apr. 12, 2011

(54) HINGE ASSEMBLY AND A FRAME FOR AN ELECTRONIC DEVICE WITH THE HINGE ASSEMBLY

(75) Inventor: Chih-Kuang Chuan, Taipei Hsien (TW)

(73) Assignee: Shin Zu Shing Precision Electron (Suzhou) Co., Ltd., Jiangsu Province (CN)

( * ) Notice: Subject to any disclaimer, the term of this patent is extended or adjusted under 35 U.S.C. 154(b) by 344 days.

(21) Appl. No.: 12/216,571

(22) Filed: Jul. 8, 2008

(65) Prior Publication Data

US 2010/0005625 A1     Jan. 14, 2010

(51) Int. Cl.
*E05D 15/06* (2006.01)
(52) U.S. Cl. .................. 16/365; 16/239; 361/679.39
(58) Field of Classification Search .......... 16/364, 16/239; 455/575.3; 379/433.12; 361/679.39
See application file for complete search history.

(56) References Cited

U.S. PATENT DOCUMENTS

| 5,040,857 | A | * | 8/1991 | Mandel et al. ............... 312/405 |
| 5,535,482 | A | * | 7/1996 | Grabber ........................ 16/286 |
| 7,010,833 | B2 | * | 3/2006 | Duarte et al. ................. 16/358 |
| 7,418,766 | B2 | * | 9/2008 | Nelson et al. ................. 16/239 |
| 7,725,988 | B2 | * | 6/2010 | Kim et al. .................... 16/361 |
| 7,823,253 | B2 | * | 11/2010 | Kao et al. ..................... 16/239 |
| 2010/0000052 | A1 | * | 1/2010 | Chung ........................... 16/364 |
| 2010/0084951 | A1 | * | 4/2010 | Bestle ........................ 312/223.1 |

* cited by examiner

*Primary Examiner* — Robert J Sandy
*Assistant Examiner* — Michael Lee
(74) *Attorney, Agent, or Firm* — Bacon & Thomas, PLLC

(57) ABSTRACT

A hinge assembly has two tracks, a main bracket, at least one connecting bracket, at least one sliding hinge and at least one tilting hinge. The main bracket is mounted slidably between the tracks. The connecting bracket is mounted securely on the main bracket. The sliding hinge corresponds to and selectively holds the connecting bracket. The tilting hinge is connecting to the main bracket. With the related movement between the connecting bracket and the sliding hinge, the connecting bracket is selectively held or moved. Therefore, a moving bracket of a frame for an electronic device being attached to the tilting hinge is selectively pushed and held in a body of the frame or received in the body.

13 Claims, 16 Drawing Sheets

HINGE ASSEMBLY AND A FRAME FOR AN ELECTRONIC DEVICE WITH THE HINGE ASSEMBLY

BACKGROUND OF THE INVENTION

1. Field of the Invention

The present invention relates to a hinge assembly, especially to a hinge assembly for an electronic device, which allows a part of the electronic device to slide and pivot.

2. Description of the Prior Arts

The horizontal type monitors having at least one display panel are widely used in service and sales industries, especially finance, banking, travel agents and even interior design and architecture. Some industries need more than one panel to simultaneously display the information. For example, stockbrokers show the entire stock list and more detailed information of specific, selected stocks. However, the additional panel increases the volume of the horizontal type monitor. Especially when the user only uses one panel, the unused panel still occupies a fixed room. Moreover, the horizontal type monitor having dual panels with the large volume is uneasy to be stowed and moved.

To overcome the shortcomings, the present invention provides a hinge assembly to mitigate or obviate the aforementioned problems.

SUMMARY OF THE INVENTION

The main objective of the present invention is to provide a hinge assembly to reduce the volume of an electronic device when the electronic device is not used. The hinge assembly has two tracks, a main bracket, at least one connecting bracket, at least one sliding hinge and at least one tilting hinge. The main bracket is mounted slidably between the tracks. The connecting bracket is mounted securely on the main bracket. The sliding hinge corresponds to and selectively holds the connecting bracket. The tilting hinge is connecting to the main bracket. With the related movement between the connecting bracket and the sliding hinge, the connecting bracket is selectively held or moved. Therefore, a moving bracket of a frame for an electronic device being attached to the tilting hinge is selectively pushed and held in a body of the frame or received in the body.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
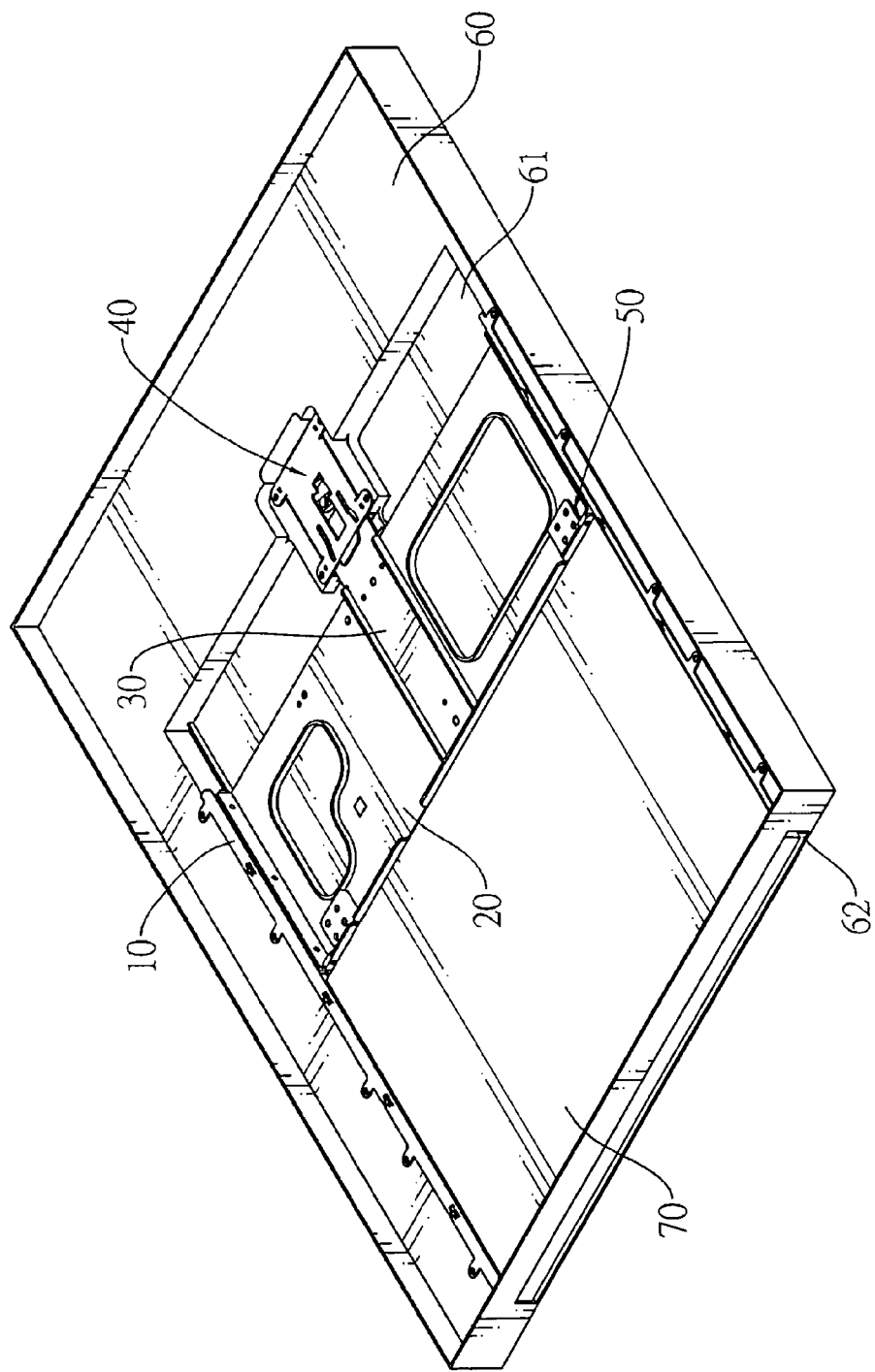
FIG. 1 is a perspective view of a frame for an electronic device with a hinge assembly in accordance with the present invention.
Figure 2:
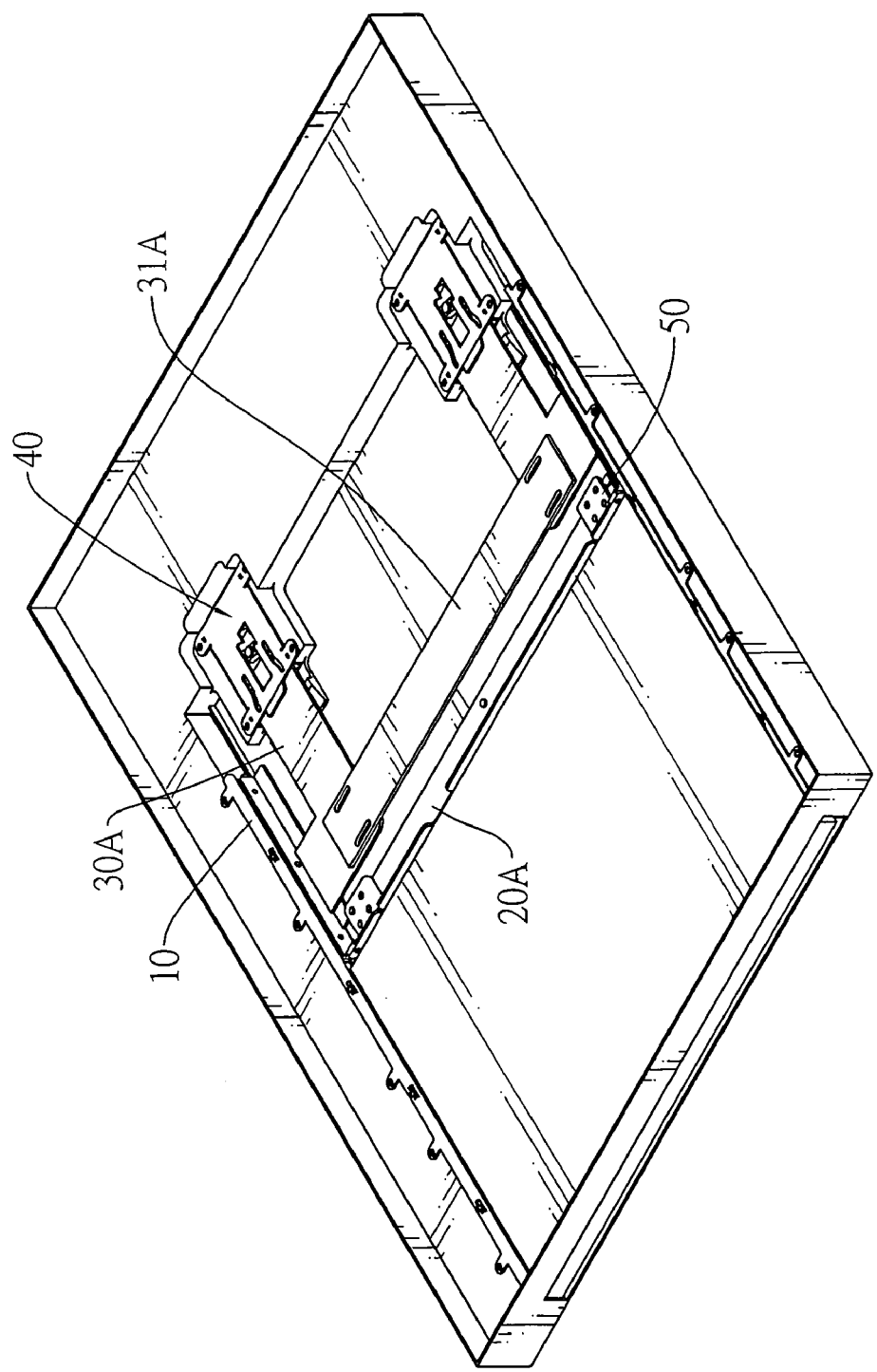
FIG. 2 is a perspective view of another embodiment of a frame for an electronic device with a hinge assembly in accordance with the present invention.

With reference to FIGS. 1 and 2, a hinge assembly in accordance with the present invention comprises two tracks (10), a main bracket (20, 20A), at least one connecting bracket (30, 30A), at least one sliding hinge (40) and at least one tilting hinge (50).

Figure 3:
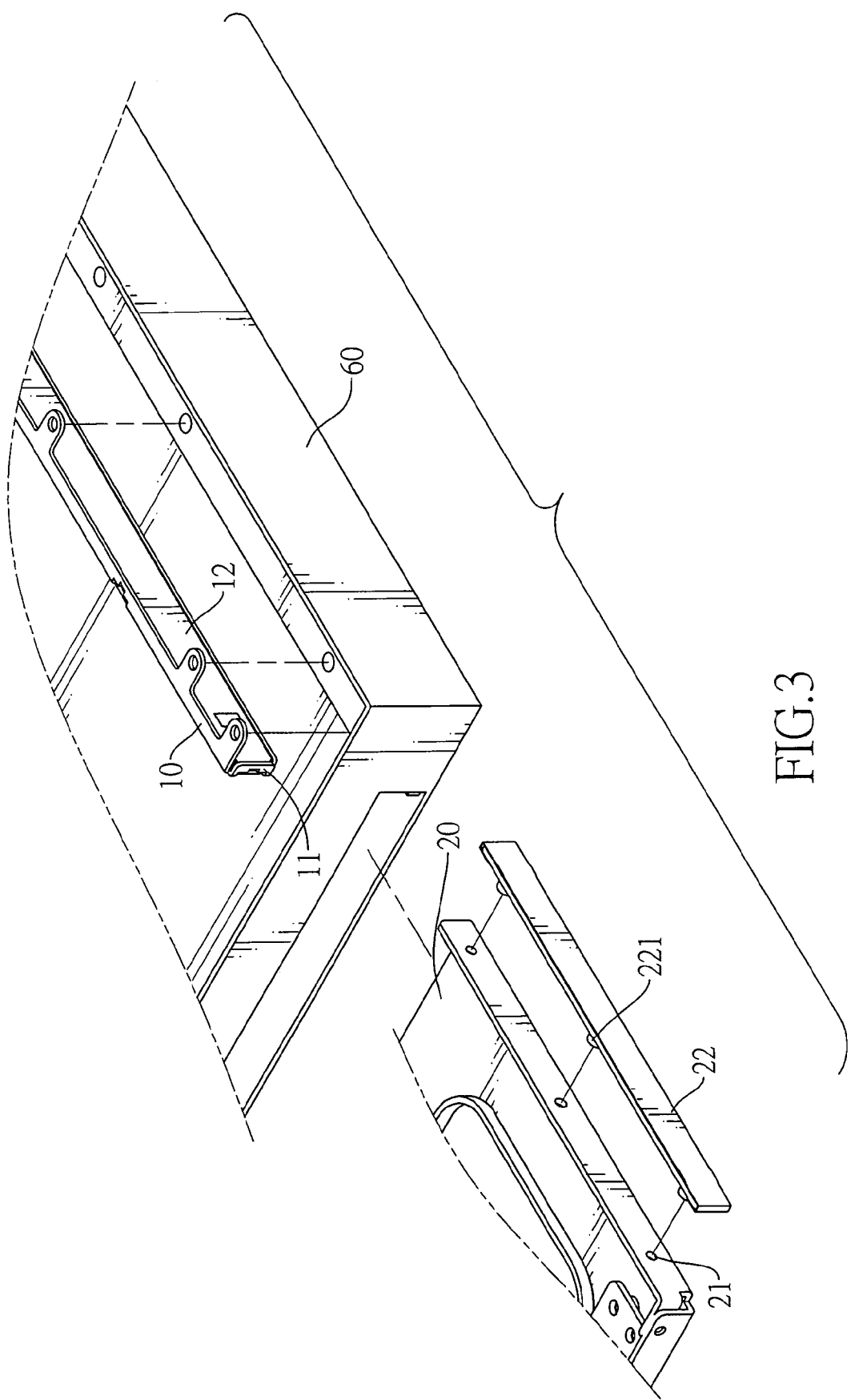
FIG. 3 is an enlarged perspective view of the frame in FIG. 1.
Figure 4:
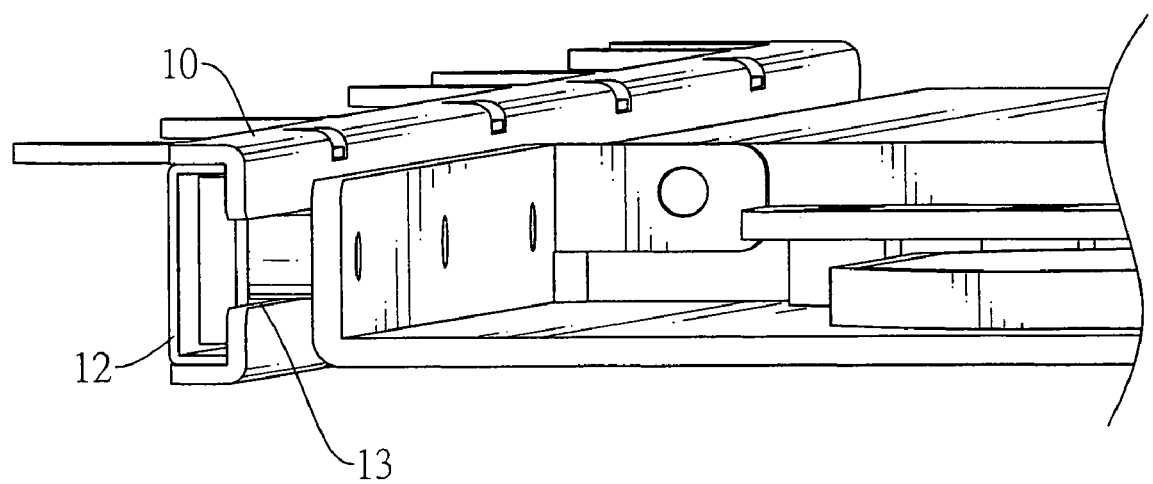
FIG. 4 is another enlarged perspective view of the frame in FIG. 1.
Figure 5:
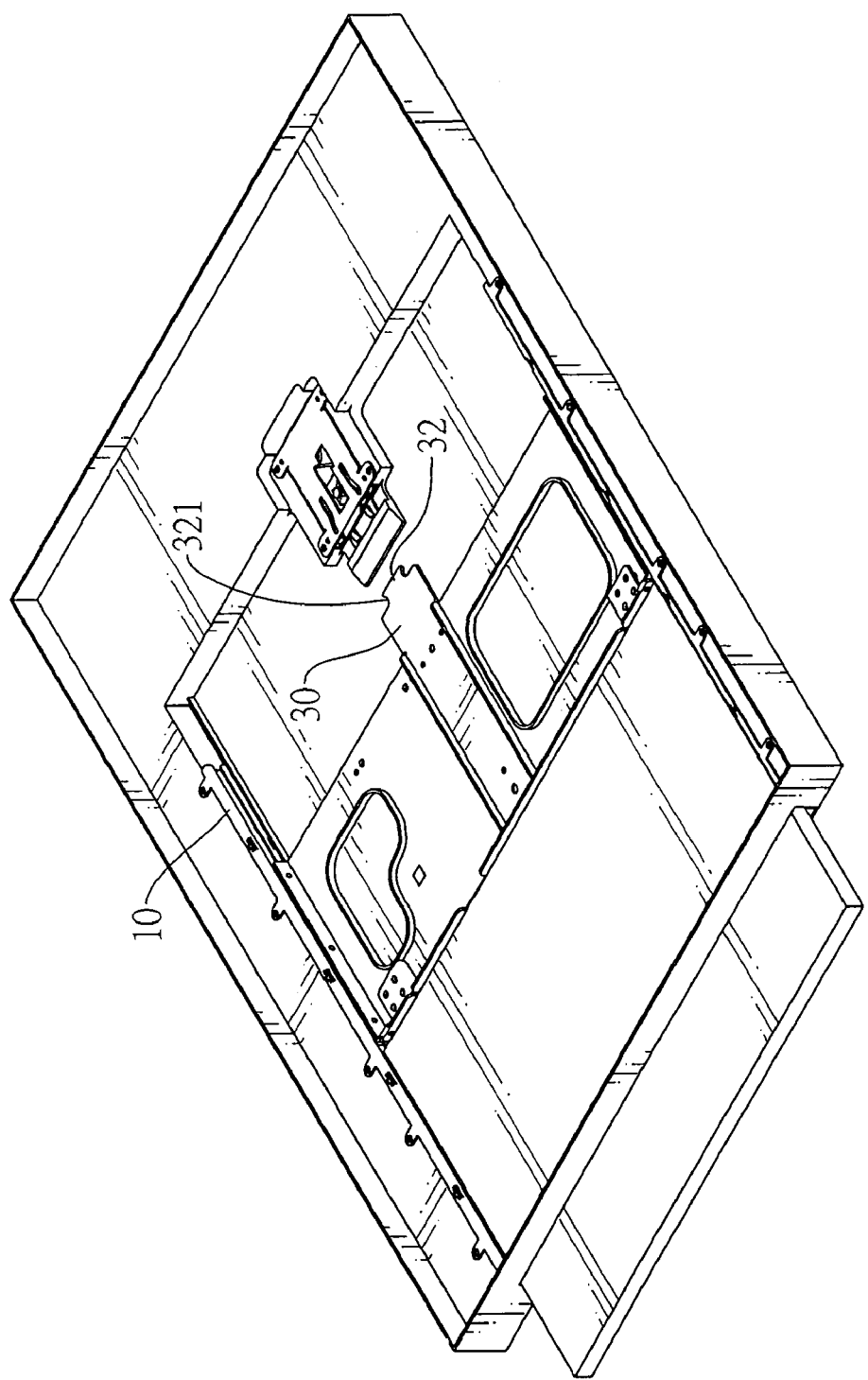
FIG. 5 is an operational perspective view of the frame in FIG. 1.
Figure 6:
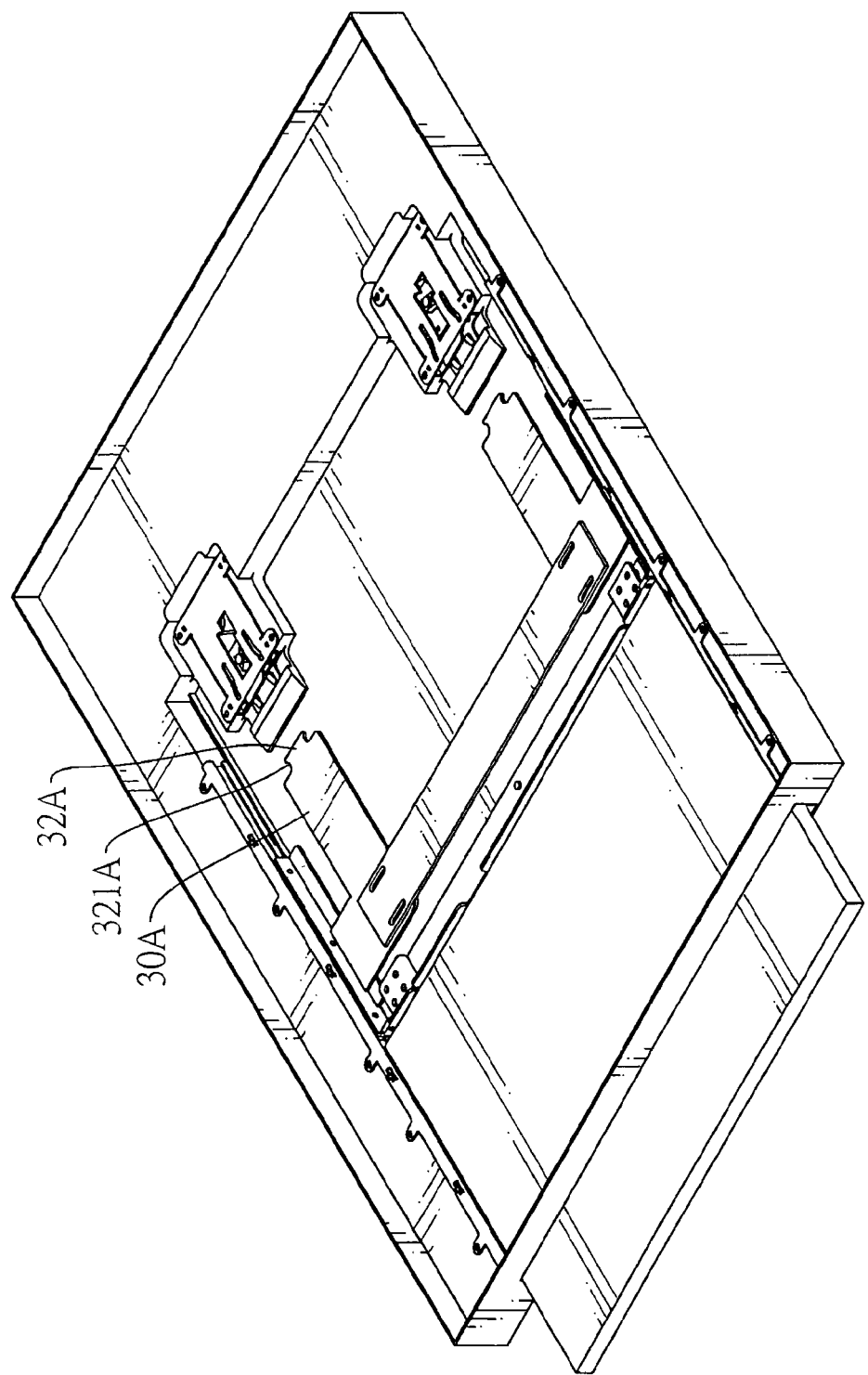
FIG. 6 is an operational perspective view of the frame in FIG. 2.

With reference to FIGS. 2 to 4, the tracks (10) are opposite to each other. Each track (10) is hollow and has a side surface, a closed end (11), an open end (12) and a slot (13). The side surfaces of the tracks (10) face to each other. The slot (13) is formed through the side surface of the track (10).

With reference to FIGS. 2 and 3, the main bracket (20, 20A) is mounted slidably between the tracks (10), may be a flat board or a U-shaped bracket and has two sides, multiple fastening holes (21) and two slides (22). The fastening holes (21) are formed through the sides of the main bracket (20, 20A). The slides (22) are respectively attached securely to the sides of the main bracket (20, 20A) and are respectively mounted slidably in the slots (13) of the tracks (10) from the open ends (12) of the tracks (10). Each slide (22) has multiple fastening protrusions (221) being mounted through the fastening holes (21) to attach the slide (22) securely to the main bracket (20, 20A).

With reference to FIGS. 1, 2, 5 and 6, the at least one connecting bracket (30, 30A) is attached securely to the main bracket (20, 20A). The hinge assembly may have two connecting brackets (30A) being attached securely to the sides of the main bracket (20A). A support bracket (31A) is mounted between the connecting brackets (30A) to keep the connecting brackets (30A) from shaking when sliding. Each connecting bracket (30, 30A) has a distal end, a tongue (32, 32A) and two bulges (321, 321A). The tongue (32, 32A) is formed on and extends out from the distal end of the connecting bracket (30, 30A) and has two sides. The bulges (321, 321A) are formed respectively on and extend out from the sides of the tongue (32, 32A).

Figure 7:
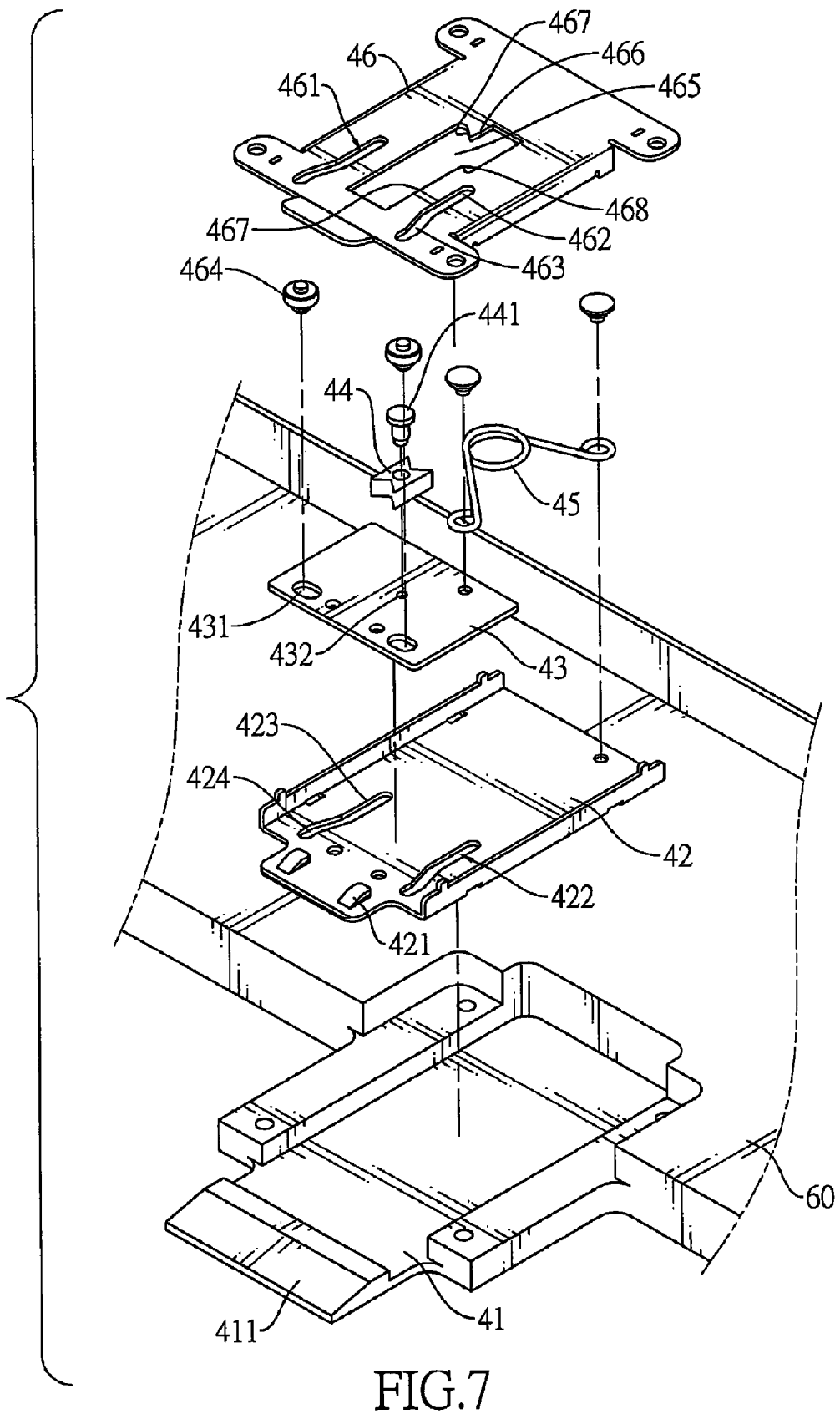
FIG. 7 is an enlarged exploded perspective view of the sliding hinge of the frame in FIG. 1.

With further reference to FIG. 7, each sliding hinge (40) corresponds to the distal end of one connecting bracket (30, 30A) to selectively hold the corresponding connecting bracket (30, 30A). Each sliding hinge (40) comprises a base (41), a stationary carrier (42), a sliding carrier (43), a rotating element (44), a resilient element (45), a cover (46) and two sliding pins (464).

The base (41) has a distal end and a guiding protrusion (411). The guiding protrusion (411) is formed on the distal end of the base (41).

The stationary carrier (42) is mounted securely on the base (41) and has a distal end, a top surface, two sides, two guiding protrusions (421) and two inner grooves (422). The guiding protrusions (421) are formed on the top surface of the stationary carrier (42) near the distal end of the stationary carrier (42). The inner grooves (422) are formed through the stationary carrier (42), are respectively near the sides of the stationary carrier (42) and are opposite to each other. Each inner groove (422) has a straight part (423) and an inclined part (424). The straight part (423) is away from the distal end of the stationary carrier (42) and the inclined part (424) is near the distal end of the stationary carrier (42). The straight parts (423) of the inner grooves (422) are nearer than the inclined parts (424) of the inner grooves (422).

Figure 8:
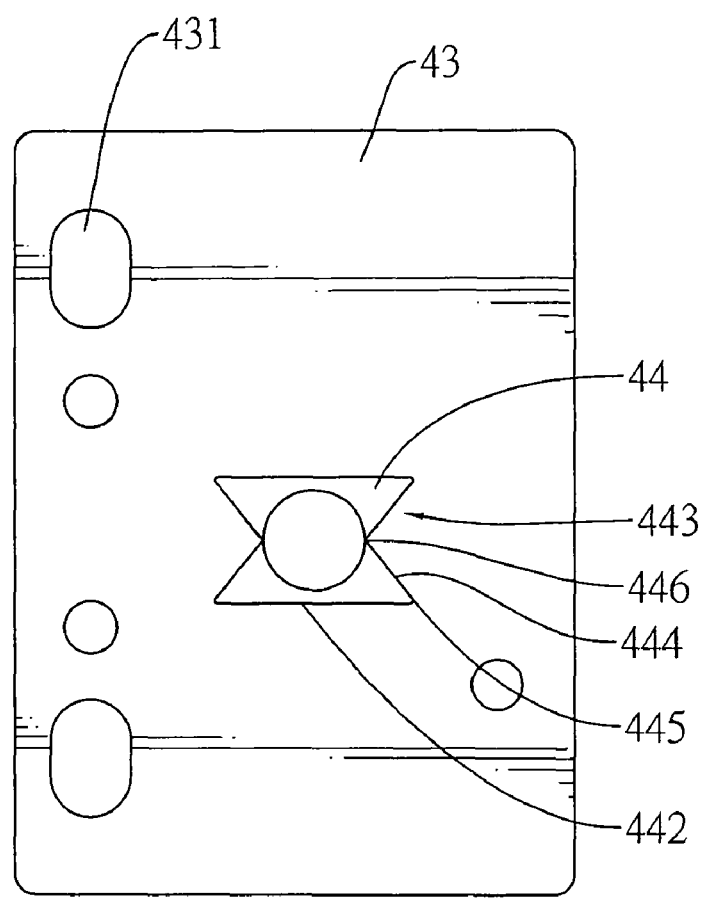
FIG. 8 is an enlarged top view of the sliding carrier and the rotating element of the sliding hinge in FIG. 7.

With further reference to FIG. 8, the sliding carrier (43) is mounted slidably on the stationary carrier (42) and has a distal end, two enlarged holes (431) and a pivot hole (432). The enlarged holes (431) are formed through the sliding carrier (43) near the distal end of the sliding carrier (43), and respectively corresponds to the inner grooves (422). The pivot hole (432) is formed through the sliding carrier (43).

The rotating element (44) is mounted rotatably on the sliding carrier (43) by a pivot pin (441) being mounted through the rotating element (44) and the pivot hole (432) of the sliding carrier (43). The rotating element (44) has two indenting sides, two straight sides (442) and two concaves (443). The straight sides (442) are opposite to each other and are adjacent to the indenting sides. The concaves (443) are formed respectively in the indenting sides of the rotating element (44). Each concave (443) is V-shaped and comprises a lower point (446), two inclined edges (444) and two sharps (445). The inclined edges (444) are connected to each other at the lower point (446). The sharps (445) are respectively formed between the inclined edges (444) and the straight sides (442).

The resilient element (45) is mounted between the sliding carrier (43) and the stationary carrier (42) and may be a spring.

The cover (46) is attached securely to the base (41) and the stationary carrier (42), is mounted on the sliding carrier (43) and has a distal end, two sides, two outer grooves (461), an actuating hole (465), an inner wall and two protruding parts (466). The outer grooves (461) are formed through the cover (46) and respectively align with the inner grooves (422) of the stationary carrier (42). Each outer groove (461) has a straight part (462) and an inclined part (463). The straight part (462) of the outer groove (461) aligns with the straight part (423) of a corresponding inner groove (422). The inclined part (463) of the outer groove (461) aligns with the inclined part (424) of a corresponding inner groove (422). The actuating hole (465) is formed through the cover (46) and is mounted around the rotating element (44). The inner wall is formed around the actuating hole (465) and has two ends and two sides. The protruding parts (466) are respectively formed inwardly from the ends and the sides of the inner wall and selectively abuts the rotating element (44). Each protruding part (466) has a straight edge, a sharp (468) and an inclined edge (467). The straight edge of the protruding part (466) is parallel to the sides of the inner wall. A perpendicular distance between the straight edges of the protruding parts (466) is larger than a distance between the straight sides (442) of the rotating element (44) and is smaller than a perpendicular distance between the sharps (445) of the concaves (443) of the rotating element (44). The inclined edge (467) of the protruding part (466) is connected to the straight edge of the protruding part (466) at the sharp (468).

The sliding pins (464) are mounted between the cover (46) and the sliding carrier (43), are respectively mounted slidably through the inner and outer grooves (422, 461) and are respectively mounted slidably through the enlarged holes (431) of the sliding carrier (43).

Figure 11:
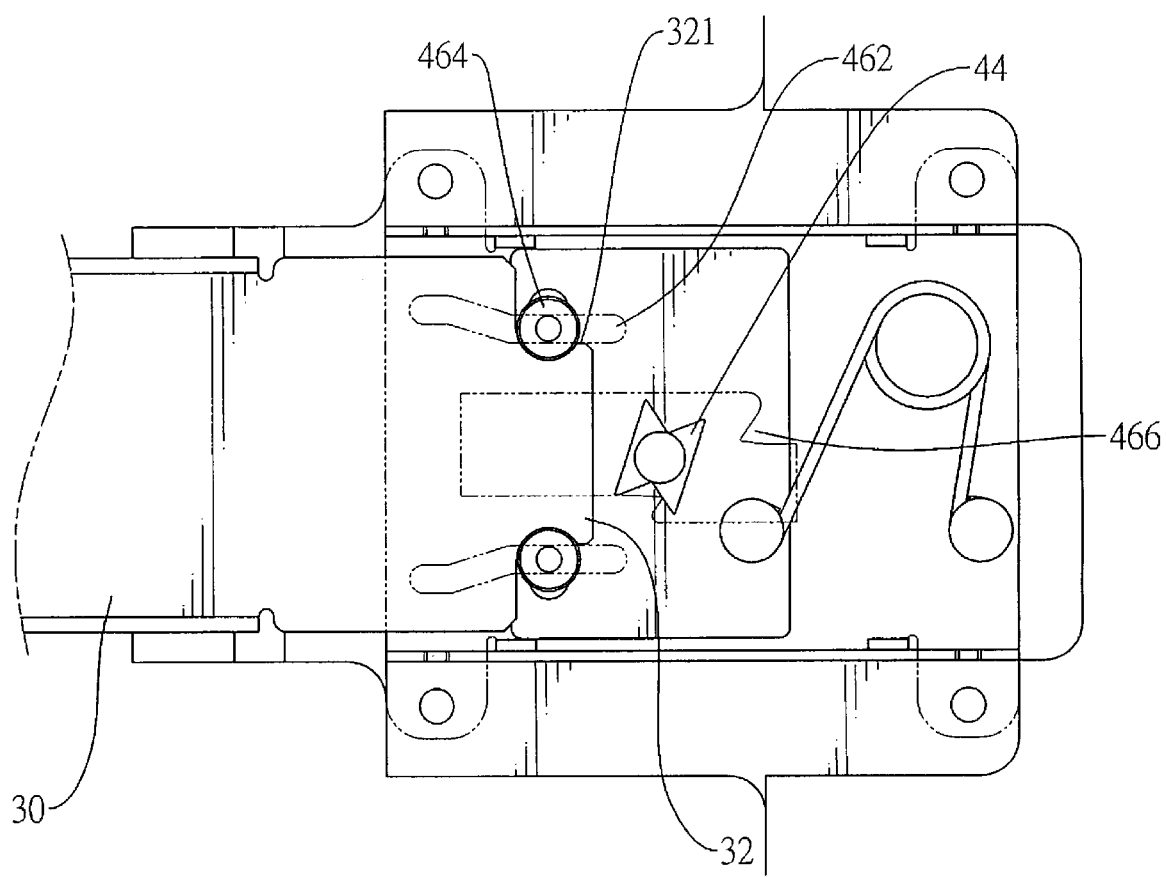
FIG. 11 is a top view of the sliding hinge in FIG. 7.
Figure 12:
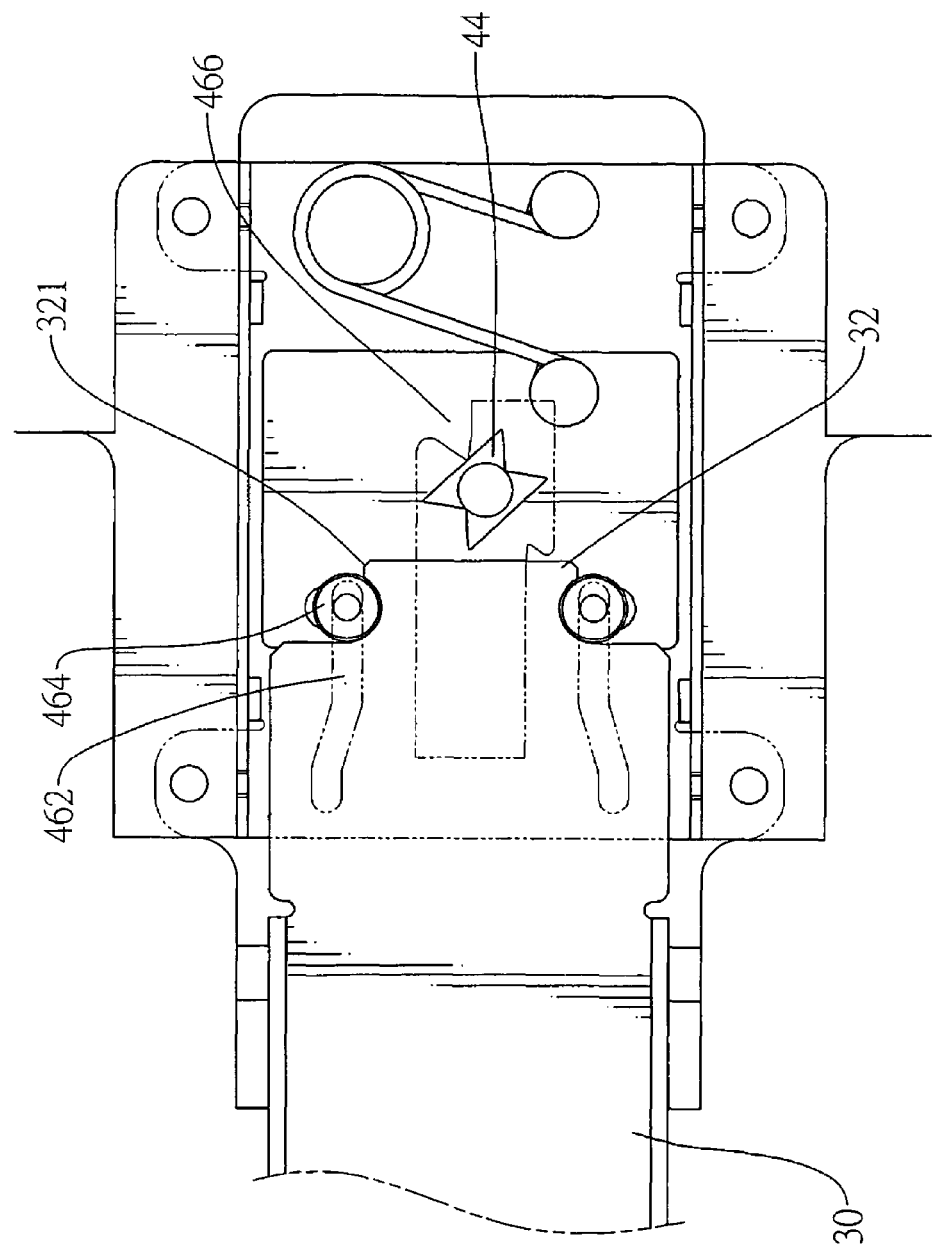
FIG. 12 is an operational top view of the sliding hinge in FIG. 7.
Figure 13:
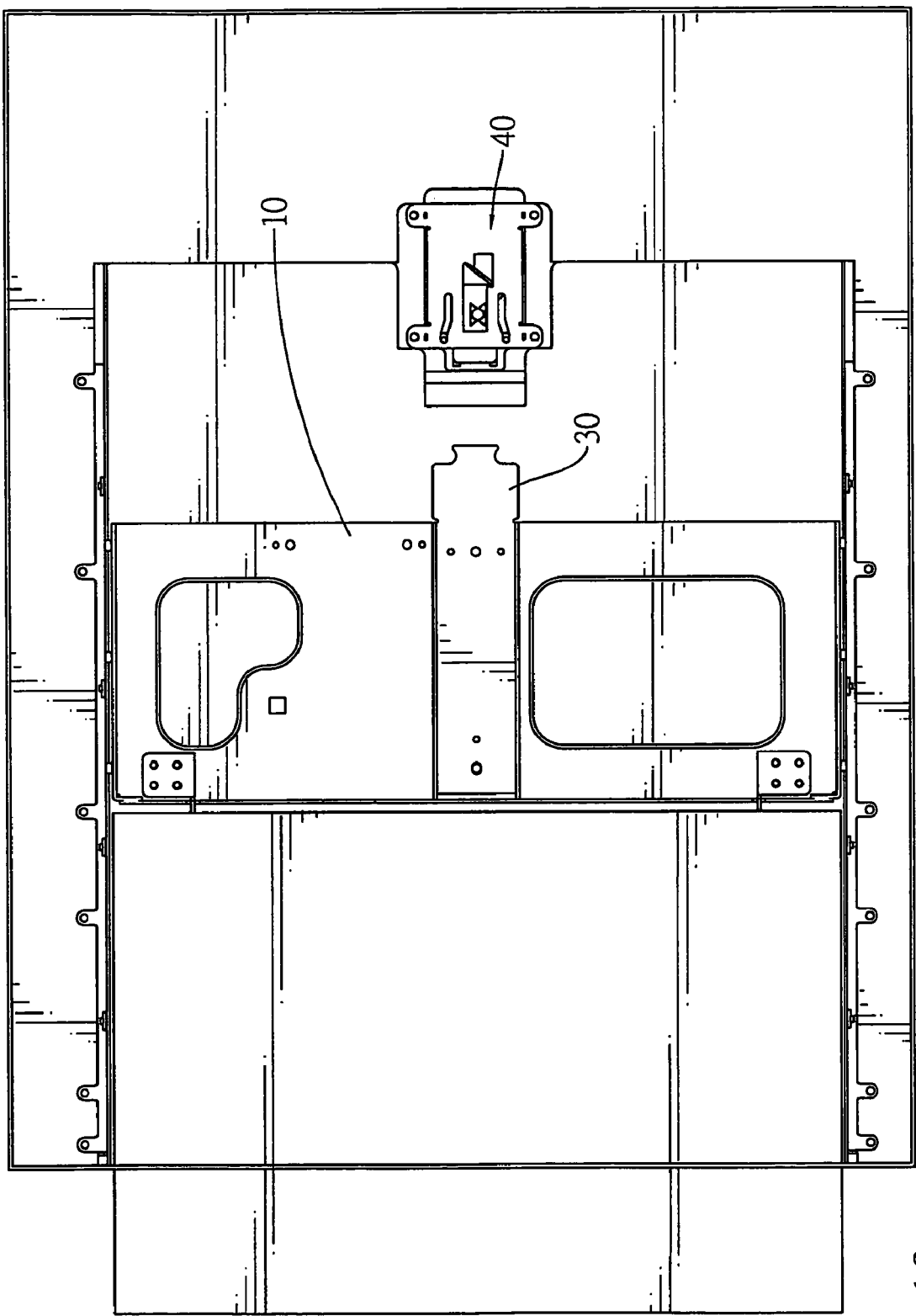
FIG. 13 is an operational top view of the frame in FIG. 1.
Figure 14:
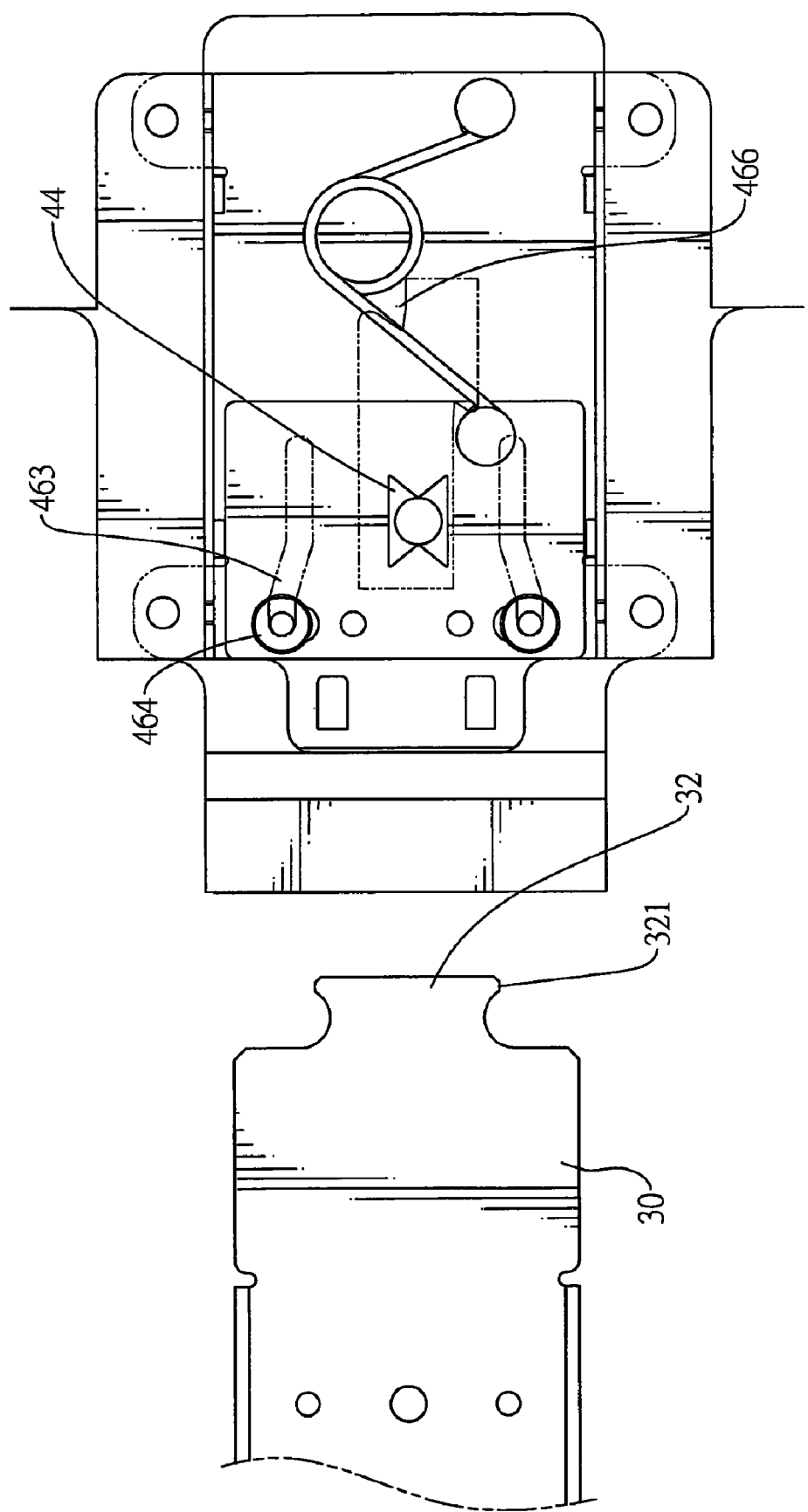
FIG. 14 is another operational top view of the sliding hinge in FIG. 7.

With reference to FIGS. 7, 11 and 14, the sliding pins (464) selectively abut the tongue (32) of the corresponding connecting bracket (30). A distance between the bulges (321) of the tongue (32) is larger than a distance between the sliding pins (464) sliding in the straight parts (423, 462) of the inner and outer grooves (422, 461). The distance between the bulges (321) of the tongue (32) is smaller than a distance between the sliding pins (464) sliding in the inclined parts (424, 463) of the inner and outer grooves (422, 461). Therefore, when the sliding pins (464) sliding in the straight parts (423, 462) of the inner and outer grooves (422, 461), the sliding pins (464) abuts the tongue (32) to keep the corresponding connecting bracket (30) from leaving the sliding hinge (40). Further, when the sliding pins (464) sliding in the inclined parts (424, 463) of the inner and outer grooves (422, 461), the sliding pins (464) are away from the tongue (32) to allow the corresponding connecting bracket (30) to leave the sliding hinge (40).

Figure 9:
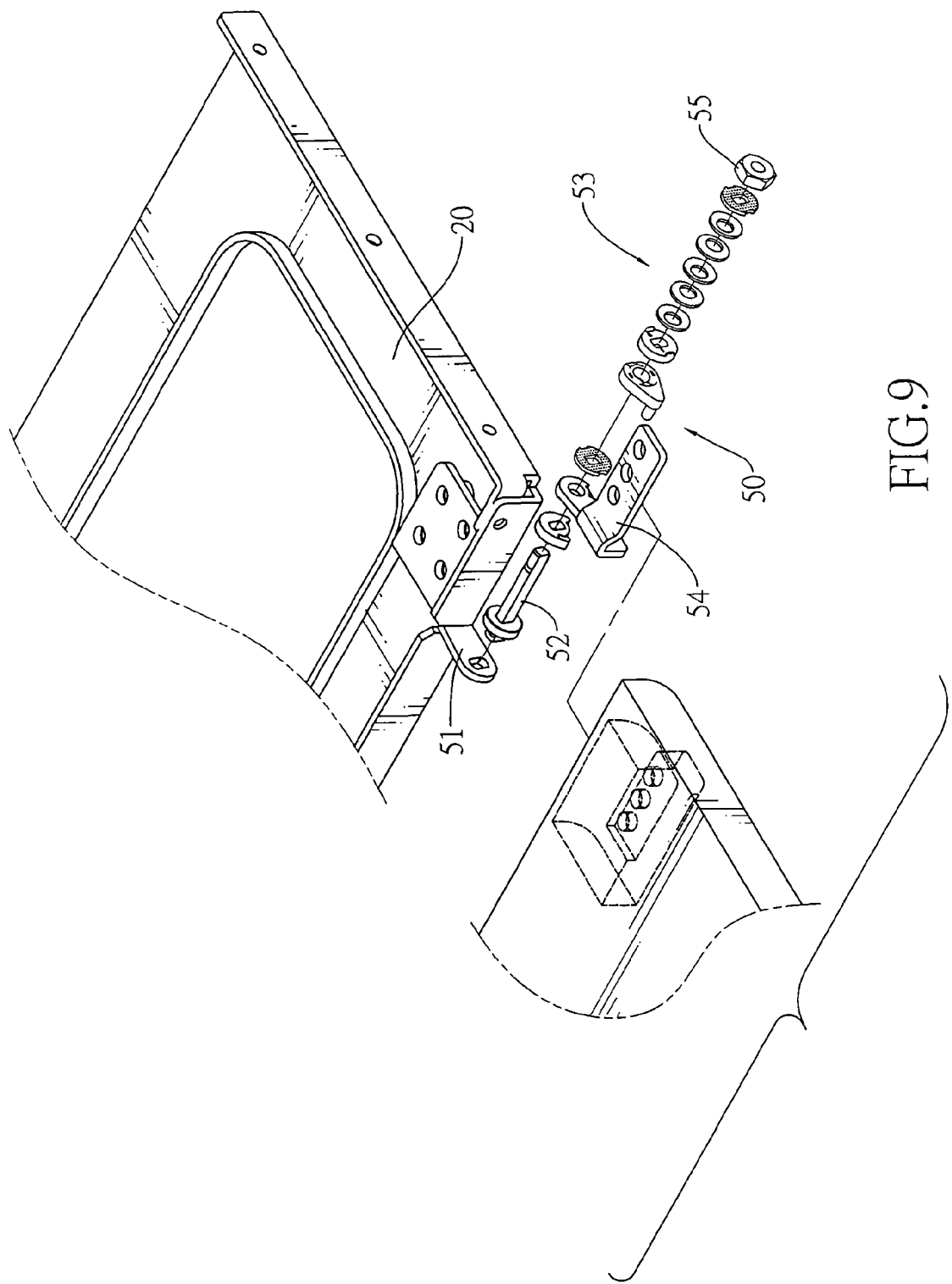
FIG. 9 is an enlarged exploded perspective view of the tilting hinge of the frame in FIG. 1.

With reference to FIGS. 2 and 9, the at least one tilting hinge (50) is connected to the main bracket (20, 20A). The hinge assembly as described may have two tilting hinges (50) respectively being mounted to two sides of the main bracket (20, 20A). Each tilting hinge (50) has a stationary leaf (51), a pintle (52), a washer assembly (53), a rotating leaf (54) and a fastener (55). The stationary leaf (51) is attached securely to the main bracket (20, 20A). The pintle (52) is attached securely to the stationary leaf (51). The washer assembly (53) is mounted around the pintle (52) to provide positioning and limiting functions. The rotating leaf (54) is mounted around the pintle (52). The fastener (55) is mounted securely around the pintle (52).

With reference to FIG. 1, a frame for an electronic device in accordance with the present invention comprises a body (60), a hinge assembly as described and a moving bracket (70).

The body (60) has a distal end, a recess (61) and an opening (62). The recess (61) is formed inside the body (60) and has two sides. The opening (62) is formed through the distal end of the body (60) and communicates with the recess (61).

With further reference to FIGS. 3 and 7, the tracks (10) of the hinge assembly as described are respectively attached securely to the sides of the recess (61) in the body (60). The sliding hinge (40) is mounted slidably in the recess (61) in the body (60).

With further reference to FIG. 9, the moving bracket (70) is attached securely to the rotating leaf (54), is mounted slidably through the opening (62) of the body (60) and is selectively completely received in the recess (61) of the body (60).

Figure 10:
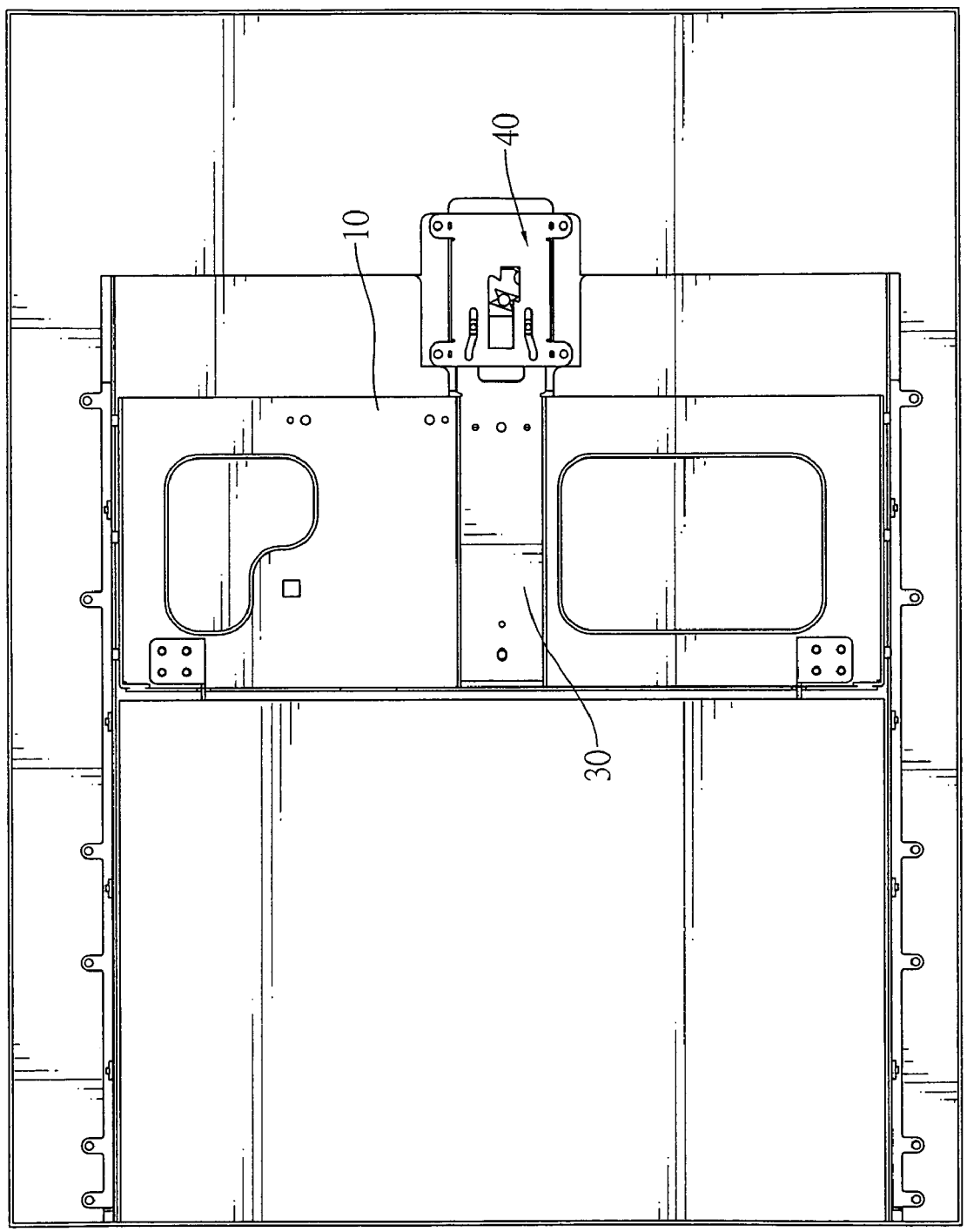
FIG. 10 is a top view of the frame in FIG. 1.

With reference to FIGS. 1, 7 and 10, the moving bracket (70) is completely received in the recess (61) of the body (60). One of the concave (443) of the rotating element (44) abuts the sharp (468) of the right protruding part (466) of the cover (46) so the rotating element (44) is held by the protruding part (466). Then the sliding pins (464) are held in the straight parts (423, 462) of the inner and outer grooves (422, 461). The tongue (32) of the connecting bracket (30) is held between the sliding pins (464) to keep the connecting bracket (30) from moving. Therefore, the moving bracket (70) is completely received in the recess (61) of the body (60).

With reference to FIGS. 1, 7 and 11 to 13, the moving bracket (70) is pulled out for the user to use the additional display panel or the input device on the moving bracket (70). When the moving bracket (70) is pushed slightly in the body (60) from the opening (62), the tongue (32) of the connecting bracket (30) pushes the rotating element (44) to slide. The sharp (468) of the left protruding part (466) of the cover (46) abuts rotating element (44) to rotating the rotating element (44) until the straight sides (444) of the rotating element (44) are parallel to the sides of the inner wall of the cover (46). Then the resilient element (45) forces the rotating element (44) to slide toward the distal end of the stationary carrier (42). The rotating element (44) brings the sliding pins (464) to slide in the inclined parts (424, 463) of the inner and outer grooves (422, 461). Then the connecting bracket (30) is allowed to leave the sliding hinge (40) along the guiding protrusions (411, 421). Therefore, the moving bracket (70) is pulled out of the recess (61) of the body (60) for the user to use the additional display panel or the input device on the moving bracket (70).

Figure 15:
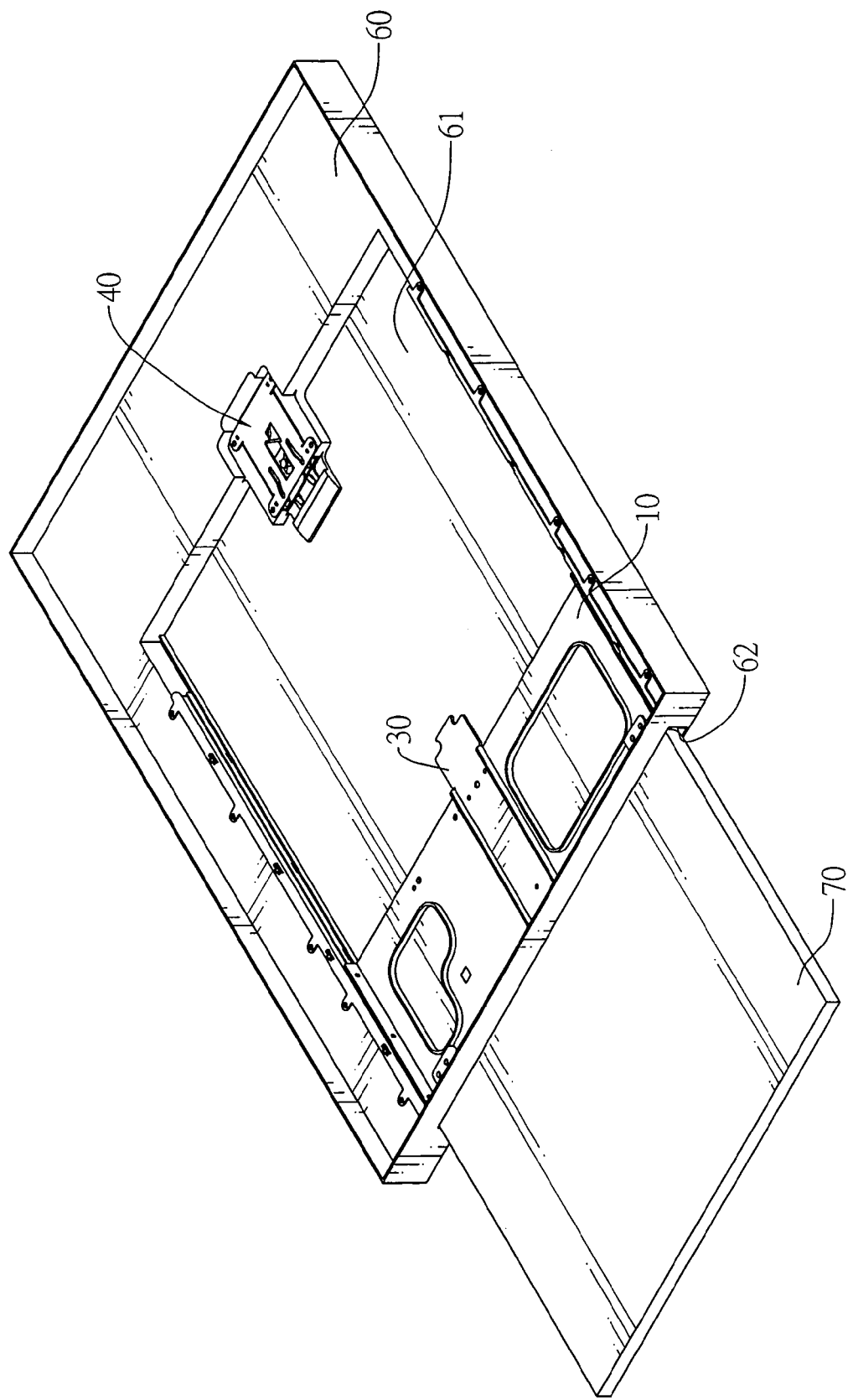
FIG. 15 is another operational perspective view of the frame in FIG. 1.
Figure 16:
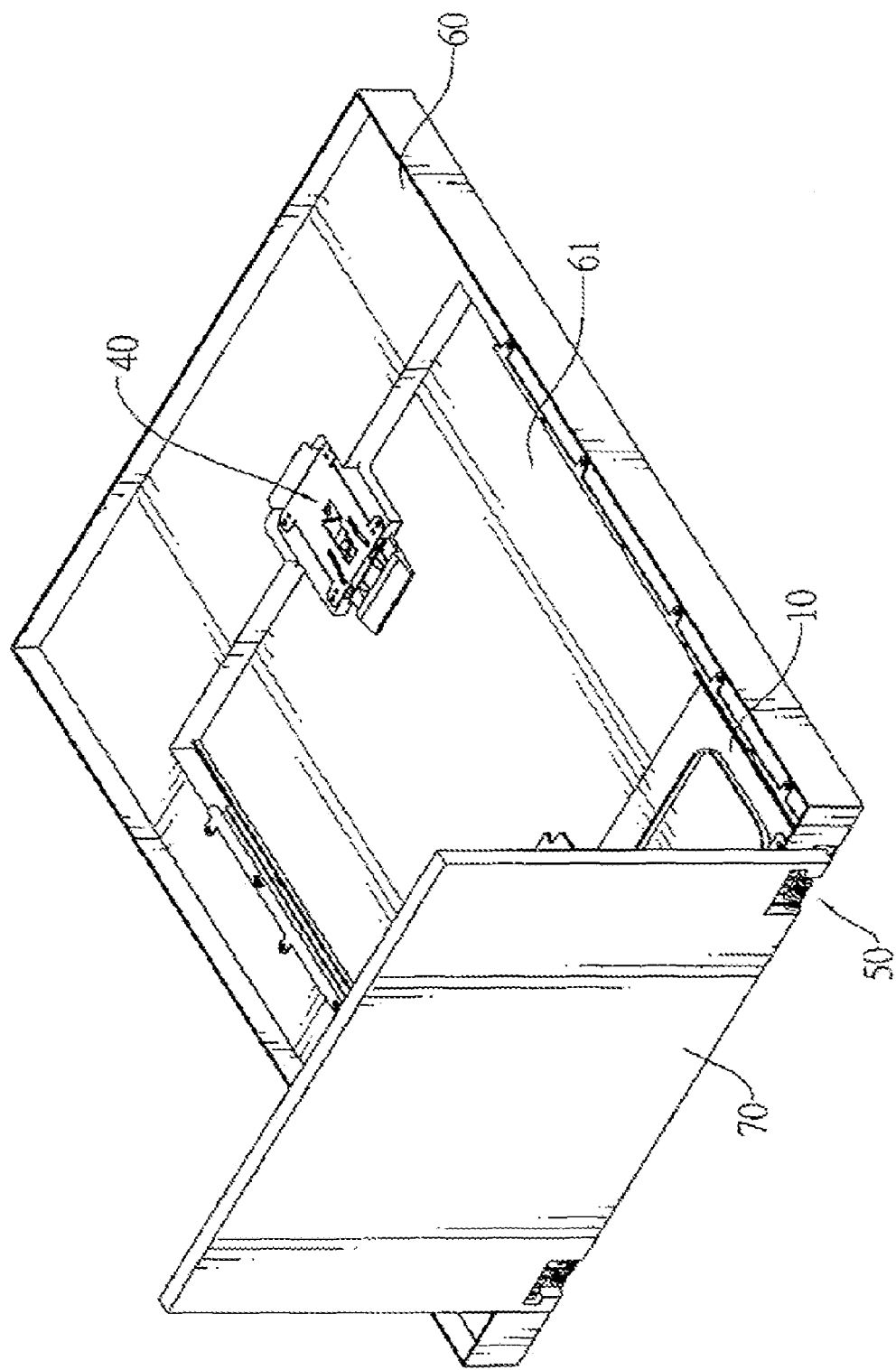
FIG. 16 is still another operational perspective view of the frame in FIG. 1.

With reference to FIGS. 15 and 16, the moving bracket (70) is completely pulled out of the recess (61) of the body (60) through the opening (62). The user can simultaneously watch the main and additional display panels or can use the input device. Furthermore, with the tilting hinge (50), the moving bracket (70) may be pivoted relative to the body 60) to change the visual angle of the additional display panel or the usage angle of the input device.

The hinge assembly as described and the frame as described have numerous advantages. With the relative connection between the connecting bracket (30) and the sliding hinge (40), the connecting bracket (30) is selectively held in the sliding hinge (40) and slid out of the sliding hinge (40). Therefore, the moving bracket (70) is selectively fully received in and completely pulled out of the recess (61) of the body (60). Thus, when the additional display panel or the input device on the moving bracket (70) is not used, the moving bracket (70) is fully received in the recess (61) of the body (60) to hide and protect the additional display panel or the input device. Furthermore, when the moving bracket (70) is fully received in the recess (61) of the body (60), the main display panel on the body (60) overlaps the additional display panel or the input device on the moving bracket (70) to reduce the volume so the electronic device is easy to be stowed and moved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge assembly comprising:
   two tracks being opposite to each other;
   a main bracket being mounted between the tracks and having two sides;
   at least one connecting bracket attached securely to the main bracket, and each one of the at least one connecting bracket having
      a distal end;
      a tongue being formed on and extending out from the distal end of the connecting bracket and having two sides; and
      two bulges being formed respectively on and extending out from the sides of the tongue; and
   at least one sliding hinge respectively corresponding to the distal end of the at least one connecting bracket and selectively holding respectively the at least one connecting bracket, and each one of the at least one sliding hinge corresponding to one connecting bracket and comprising
      a base having a distal end;
      a stationary carrier being mounted securely on the base and having
         a distal end;
         a top surface;
         two sides; and
         two inner grooves being formed through the stationary carrier, being respectively near the sides of the stationary carrier and being opposite to each other, and each inner groove having
            a straight part being away from the distal end of the stationary carrier; and
            an inclined part being near the distal end of the stationary carrier, wherein the straight parts of the inner grooves are nearer than the inclined parts of the inner grooves;
      a sliding carrier being mounted slidably on the stationary carrier and having
         a distal end; and
         two enlarged holes being formed through the sliding carrier near the distal end of the sliding carrier, and respectively corresponding to the inner grooves;
      a rotating element being mounted rotatably on the sliding carrier and having
         two indenting sides;
         two straight sides being opposite to each other and being adjacent to the indenting sides; and
         two concaves being formed respectively in the indenting sides of the rotating element, and each concave being V-shaped and comprising
            a lower point;
            two inclined edges being connected to each other at the lower point; and
            two sharps being respectively formed between the inclined edges of the concave and the straight sides of the rotating element;
      a resilient element being mounted between the sliding carrier and the stationary carrier;
      a cover being attached securely to the base and the stationary carrier, being mounted on the sliding carrier and having
         a distal end;
         two sides;
         two outer grooves being formed through the cover and respectively aligning with the inner grooves of the stationary carrier, and each outer groove having
            a straight part aligning with the straight part of a corresponding inner groove; and
            an inclined part aligning with the inclined part of the corresponding inner groove;
         an actuating hole being formed through the cover and being mounted around the rotating element;
         an inner wall being formed around the actuating hole and having two ends and two sides; and
         two protruding parts being respectively formed inwardly from the ends and the sides of the inner wall and selectively abutting the rotating element, and each protruding part having
            a straight edge being parallel to the sides of the inner wall;
            a sharp; and
            an inclined edge being connected to the straight edge of the protruding part at the sharp of the protruding part; and two sliding pins being mounted between the cover and the sliding carrier, being respectively mounted slidably through the inner and outer grooves, being respectively mounted slidably through the enlarged holes of the sliding carrier and selectively abutting the tongue of the corresponding connecting bracket; and at least one tilting hinge being connecting to the main bracket, and each one of the at least one tilting hinge having a stationary leaf being attached securely to the main bracket;

a pintle being attached securely to the stationary leaf;

a washer assembly being mounted around the pintle;

a rotating leaf being mounted around the pintle; and a fastener being mounted securely around the pintle.

2. The hinge assembly as claimed in claim 1, wherein a perpendicular distance between the straight edges of the protruding parts of the cover of each one of the at least one sliding hinge is larger than a distance between the straight sides of the rotating element of each one of the at least one sliding hinge and is smaller than a perpendicular distance between the sharps of the concaves of the rotating element of each one of the at least one sliding hinge.

3. The hinge assembly as claimed in claim 1, wherein the sliding carrier of each one of the at least one sliding hinge has a pivot hole being formed through the sliding carrier; and each one of the at least one sliding hinge has a pivot pin being mounted through the rotating element and the pivot hole of the sliding carrier.

4. The hinge assembly as claimed in claims 2, wherein the sliding carrier of each one of the at least one sliding hinge has a pivot hole being formed through the sliding carrier; and each one of the at least one sliding hinge has a pivot pin being mounted through the rotating element and the pivot hole of the sliding carrier.

5. The hinge assembly as claimed in claim 1, wherein the base of each one of the at least one sliding hinge has a guiding protrusion and being formed on the distal end of the base; and the stationary carrier of each one of the at least one sliding hinge has two guiding protrusions being formed on the top surface of the stationary carrier near the distal end of the stationary carrier.

6. The hinge assembly as claimed in claim 4, wherein the base of each one of the at least one sliding hinge has a guiding protrusion and being formed on the distal end of the base; and the stationary carrier of each one of the at least one sliding hinge has two guiding protrusions being formed on the top surface of the stationary carrier near the distal end of the stationary carrier.

7. The hinge assembly as claimed in claim 6, wherein each track is hollow and has a side surface, wherein the side surfaces of the tracks face to each other;

a closed end;

an open end; and a slot being formed through the side surface of the track; and the main bracket has two slides being respectively attached securely to the sides of the main bracket and being respectively mounted slidably in the slots of the tracks from the open ends of the tracks.

8. The hinge assembly as claimed in claim 7, wherein the main bracket has multiple fastening holes being formed through the sides of the main bracket; and each slide of the main bracket has multiple fastening protrusions being mounted through the fastening holes of the main bracket.

9. The hinge assembly as claimed in claim 1, wherein the main bracket is a flat board;

the hinge assembly has one connecting bracket; and the hinge assembly has one sliding hinge.

10. The hinge assembly as claimed in claim 8, wherein the main bracket is a flat board;

the hinge assembly has one connecting bracket; and the hinge assembly has one sliding hinge.

11. The hinge assembly as claimed in claim 1, wherein the main bracket is U-shaped;

the hinge assembly has two connecting brackets being attached to the sides of the main bracket;

a support bracket being mounted between the connecting brackets; and the hinge assembly has two sliding hinge.

12. The hinge assembly as claimed in claim 8, wherein the main bracket is U-shaped;

the hinge assembly has two connecting brackets being attached to the sides of the main bracket;

a support bracket being mounted between the connecting brackets; and the hinge assembly has two sliding hinge.

13. A frame for an electronic device comprising a body having a distal end;

a recess being formed inside the body and having two sides; and an opening being formed through the distal end of the body and communicating with the recess;

a hinge assembly as claimed in claim 1;

the tracks of the hinge assembly is respectively attached securely to the sides of the recess in the body;

the at least one sliding hinge is mounted slidably in the recess in the body; and a moving bracket is attached securely to the rotating leaf of each one of the at least one tilting hinge, is mounted slidably through the opening of the body and is selectively completely received in the recess of the body.

* * * * *